S. F. ANDERSON.
SURFACE WORKING MACHINE.
APPLICATION FILED DEC. 20, 1918.

1,331,451.

Patented Feb. 17, 1920.
3 SHEETS—SHEET 1.

Fig. 1.

Inventor:
Swan F. Anderson
By Ira J. Wilson
Atty.

S. F. ANDERSON.
SURFACE WORKING MACHINE.
APPLICATION FILED DEC. 20, 1918.

1,331,451. Patented Feb. 17, 1920.
3 SHEETS—SHEET 3.

UNITED STATES PATENT OFFICE.

SWAN F. ANDERSON, OF ROCKFORD, ILLINOIS, ASSIGNOR TO ANDERSON BROS. MFG. CO., OF ROCKFORD, ILLINOIS, A CORPORATION OF ILLINOIS.

SURFACE-WORKING MACHINE.

1,331,451.   Specification of Letters Patent.   Patented Feb. 17, 1920.

Application filed December 20, 1918. Serial No. 267,629.

*To all whom it may concern:*

Be it known that I, SWAN F. ANDERSON, a citizen of the United States, residing at Rockford, in the county of Winnebago and State of Illinois, have invented certain new and useful Improvements in Surface-Working Machines, of which the following is a specification.

This invention pertains in general to the working of metal, wood and other surfaces by an appropriate tool or surface-engaging means, for the purpose of finishing such surface as through the medium of a scraping blade, or for polishing it by means of a suitable burnishing pad or the like, or for otherwise working on a surface by a tool which moves thereover, preferably in a back-and-forth movement.

Generally stated, my improvements relate to that class of surface working which has almost universally been performed by hand tools, due largely to the fact that the nature of the work required careful and skilled manipulation and guidance of the tool. For example, in machine shops and other places where flat metal surfaces must be worked or trued to a fine degree of accuracy, hand scrapers have been used as the most expedient and effectual means for such purpose. This hand work, however, is very slow and tiring and often the surfaces must be worked down considerably and at the same time very accurately.

The chief purpose of the present invention is to provide a power-operated machine or tool adapted to be manipulated after the fashion of an ordinary hand scraper or any similar tool which is manually moved back and forth over the work, and in the application of power to perform a manually guidable working stroke corresponding to the natural working movement of the arms when using a hand tool.

In furtherance of this general idea, my invention embraces other objects of importance, one of which is the provision of a reciprocable manually guidable tool of the character in mind mounted on a mobile carriage which preferably travels on a track or guideway and permits movement of the machine to extend or adjust its range of operation; and another object is the provision of means permitting the carriage to be freely moved to change the position of the tool during a non-working period and causing the carriage to be clamped or otherwise secured in a working position on the guideway when power is applied to the tool to perform the working stroke. And a further object as regards this feature is the provision of means operated from a common control for locking the carriage in position and applying power to the tool.

Another object resides in the provision of a scraper or similar manually guidable tool operated in a back-and-forth movement by a suitable power medium which is controlled by a manually operable means so associated with the tool as to be operable by one of the hands which directs and guides the tool while it is being moved under the influence of the power. And another object is the provision of a power-controlled means of such character as to give a variable working stroke and permitting the operator to instantly retract the tool at any point, or to obtain a full length stroke, or short quick power strokes at any point within the limits of the full length strokes, or any variation of these strokes. Thus, the power is instantly applied to obtain manually guided power working strokes which simulate the working of a strictly hand tool, but which perform the work more quickly and effectually than is possible with a hand tool.

I have also aimed to provide a regulable means for governing the speed of the working stroke, whereby the speed may be changed at will in accordance with the conditions and requirements of the particular work at hand, which speed governing means is preferably independent of the manual control of the power-operated means. In this regard I also aim to obtain a modulated working stroke and a quick return stroke.

Still another object is the provision in a machine of the character in mind of a tool holder which allows oscillation of the tool to conform to the surface of the work and to permit of the desired manipulation of the surface-engaging face of the tool.

My invention also contemplates the provision of a novel mechanism for accomplishing the foregoing objects, although it should be understood that the invention in its broader aspect is not limited to the use of any particular power medium for reciprocating the tool or for clamping the carriage in working position. In the present instance, however, I have illustrated as a working example a fluid-operated machine, the principle of operation and construction of which are embraced in the objects prefaced above.

Other objects and attendant advantages will be appreciated as the invention becomes better understood by reference to the following description when considered in connection with the accompanying drawings, in which—

As mentioned above, my improvements contemplate the provision of a manually guidable tool holder operated in a novel manner by power, the application of which is under the direct control of the operator so that the power is applied and shut off by one of the hands which guides the tool, thereby enabling a variable power working stroke simulating the working movement of a hand tool. The tool holder manually guidable during the working stroke, and in fact, at all times, is reciprocated by power in such manner that the thrust or strain is taken by the machine itself, thus relieving the operator of all effort save that of guiding the tool and controlling the power. The principle of operation of a machine or tool operating means of the character contemplated and embraced by the present invention is adapted for carrying tools or working elements of various descriptions for working different surfaces by back-and-forth movements thereover, and as a working illustration of my improvements I have taken as an example the operation of a scraping blade. The use of hand scrapers for working metal surfaces is well known, but so far as I am aware, a tool of this or any analogous character has not been provided which is power operated and manually guidable and operable after the fashion of a hand tool.

My invention contemplates the mounting of a power-operated tool holder of the foregoing character on a carriage or traveling support which gives a comparatively wide range of operation, and further contemplates the automatic locking of such carriage in working position substantially simultaneously with the application of power to the tool. In the present case I have shown the main support for my improvements in the form of an overhead channel beam or rail designated by the character 15, which may be suitably supported in a stationary working position and adapted for adjustment to different positions if necessary. On this rail or guideway a suitable carriage designated generally by the character 16, is mounted to travel and to be clamped, clutched or otherwise fixedly secured thereon by means which will be presently described. To this carriage is attached a suitable power-operated mechanism designated generally by the character 17 which imparts reciprocatory movement to a tool holder at present in the form of a pole 18 adapted to carry at its free end a surface-working tool, such for example as a scraping blade 19 and a throttle or control element 21 adapted to be actuated for controlling the power-operated mechanism. The invention in its broader aspect contemplates the provision of any suitable power-operated mechanism for reciprocating the tool holder 18, and in the present case the power medium is a fluid under pressure. By manipulating the throttle element 21, this fluid which is preferably air under pressure, is caused to reciprocate the tool holder 18 and lock the carriage 16 in position on the rail or guideway 15 to perform the working stroke, and upon further actuation of the throttle the tool will be retracted and the carriage released. This brief explanation it is believed, will facilitate an understanding of the construction and operation as given in the following description.

Figures 2, 3, 4, 5, 6, 7:
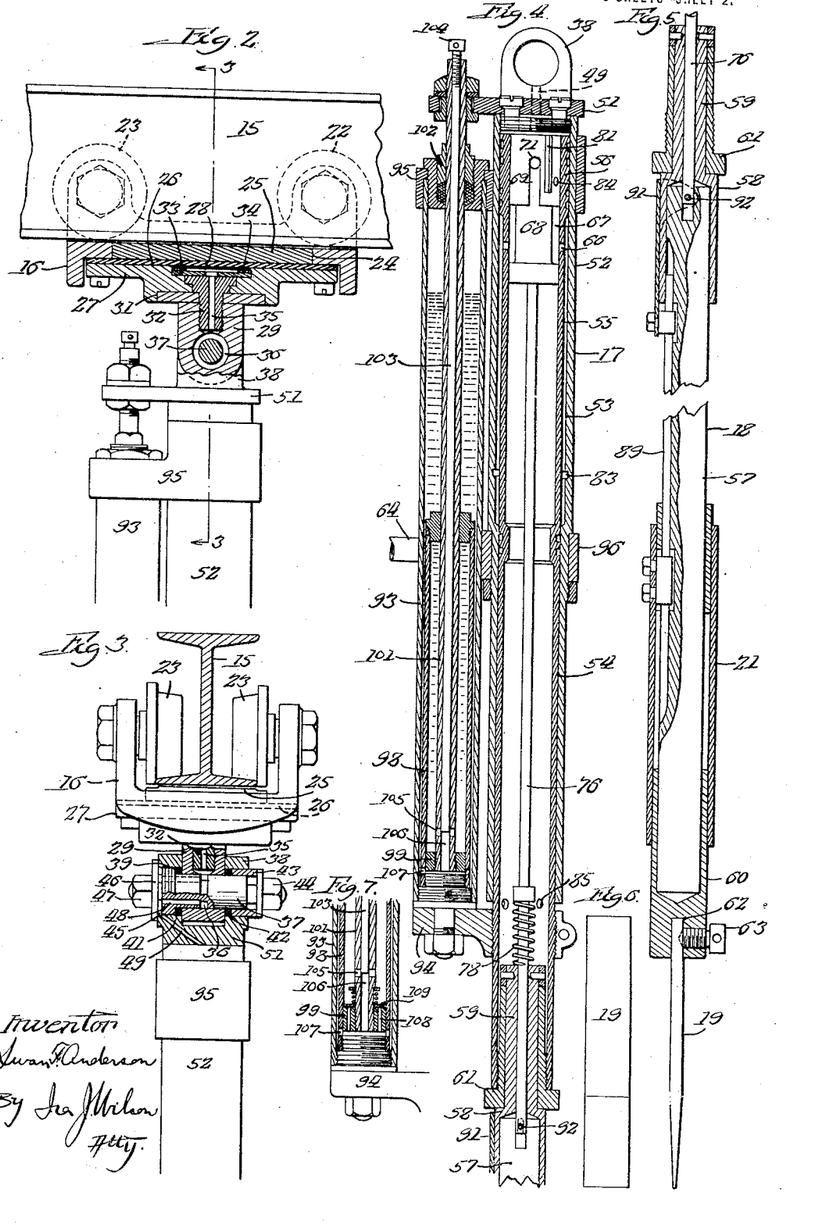
Fig. 2, a fragmentary view illustrating in vertical longitudinal section the carriage which supports the operating mechanism and showing in elevation simply the upper end of this mechanism.
Fig. 3, a cross-sectional view taken substantially on the line 3—3 of Fig. 2.
Fig. 4, a longitudinal sectional view through the fluid-operated mechanism for reciprocating the tool.
Fig. 5, a longitudinal sectional view illustrating the construction of the tool holder proper and the throttle or control device.
Fig. 6, a side view of the scraping tool removed from its holder.
Fig. 7, a fragmentary sectional view showing another form of the governor valve construction.

Referring now more particularly to Figs. 2 and 3, it will be noted that the carriage 16 is supported on the rail 15 by means of forward and rear pairs of rollers 22 and 23 respectively, and is shaped to straddle the underside of the rail. The carriage has a central opening 24 directly beneath the rail in which is vertically movable a clamping block 25 adapted to be pressed upwardly into clamping engagement with the underside of the rail for locking the carriage fixedly in connection therewith. Since the power medium in this case is air under pressure, I employ an air or fluid-actuated diaphragm 26 positioned immediately below the clamping block 25. This diaphragm of leather or other suitable material is secured marginally to the carriage frame 16 by means of a base plate 27, and air is admitted in the manner presently mentioned, to the compartment 28 for raising the diaphragm and clamping block. The base plate 27 carries a pivotal depending coupling member 29 having an annular bearing 31 in the base plate whereby the power-operated tool which is coupled to the member 29 may swivel about a vertical axis. The member 29 is held in position by a central coupling part 32 threaded tight in connection with the member 29 and having a shouldered engagement with the base plate 27 as shown clearly in Fig. 2, the parts 29 and 32 being integral in effect. A suitable leather washer 33 or the equivalent held in position by the marginal gasket 34 seals the joint between the parts 32 and 27 to prevent leakage of air. The air is supplied to the diaphragm compartment 28 through the passage 35 in the part 32, which passage communicates with an annular groove 36 in the coupling bolt 37. This bolt pivotally connects the part 29 and bifurcated or yoked end 38 of the power-operated mechanism. As shown in Fig. 3, the bolt 37 has a threaded engagement 39 with one of the arms of the part 38, whereby this threaded portion of the bolt is drawn tight against a packing gasket 41 to seal the adjacent joint between the coupling parts. The opposite joint is sealed by a packing gasket 42 held tight by the sleeve 43 and the nut 44 on the bolt. An annular space 45 is allowed between the threaded portion 39 and an end piece or closure 46 which is held tightly in position by the nut 47. This annular space 45 communicates with a plurality of air passages 48 in the bolt 37. The passages 48 intersect the central air passage 36, and communicate also with an air passage 49 through the head 51 of the main cylinder which will be presently described. When air is admitted to this cylinder for operating the tool, it simultaneously enters the diaphragm compartment 28 and locks the carriage 16 on the guide rail 15, the course of the air for this purpose being through the passages 49, 45, 48, 36 and 35, to the compartment 28. It will be apparent that the pivotal joint or coupling between the carriage 16 and the power-operated mechanism permits a universal movement, that is, vertical movement about the horizontal axis of the bolt 37 and horizontal movement about the vertical axis of the part 32, and that the several joints between the movable parts are effectually packed and sealed against leakage of the air which is carried through these relatively movable coupling parts to actuate the carriage clamping or locking means. Thus I have provided what may be termed a clutch operable between the carriage 16 and its guideway for locking the carriage in working position at predetermined times.

While this invention embraces the use of any power medium for operating the tool holder, I have employed as an illustration of the principles of my invention, a fluid-actuated mechanism of novel construction, which will now be described. Referring more particularly to Figs. 4 and 5, I have provided a main cylinder 52 rigidly joined to the head 51 already mentioned as being integral with the coupling part 38, the cylinder being divided into two general portions having larger and smaller bores 53 and 54 respectively. An elongated piston designated generally by character 55 fits slidingly in the bore 54, and being substantially coextensive in length with the cylinder, has a head 56 of enlarged diameter slidably fitting in the larger bore 53. This piston, adapted to be reciprocated by fluid pressure, is directly connected with the elongated tool holder 18 mentioned above, so that the piston and tool holder operate as one integral part with the exception that the holder has a swiveling movement with respect to the piston, permitting the tool to be oscillated to conform to the surface being worked and to permit of the desired manipulation of the tool. In the present instance, I have illustrated the tool holder as comprising a pole or rod 57 of wood of sufficient strength, rigidly secured at its upper end in the socket of a part 58 having a reduced end 59 rotatable in a coupling member 61 and held against longitudinal movement with respect thereto, this coupling member in turn being threadingly engaged and rigidly secured to the end of the piston. The lower end of the rod 57 fits securely in the socket of the tool holder proper designated by the character 60, which for the present use of the machine is provided with a socket 62 for the reception of the scraper blade 19 and with a locking nut 63 for rigidly securing the blade in connection with the holder. From the foregoing it will be manifest that the tool holder, in effect integral with the piston, is adapted to be reciprocated by the latter and is capable of oscillation about the longitudinal axis of the tool holder for the purpose mentioned.

Figure 1:
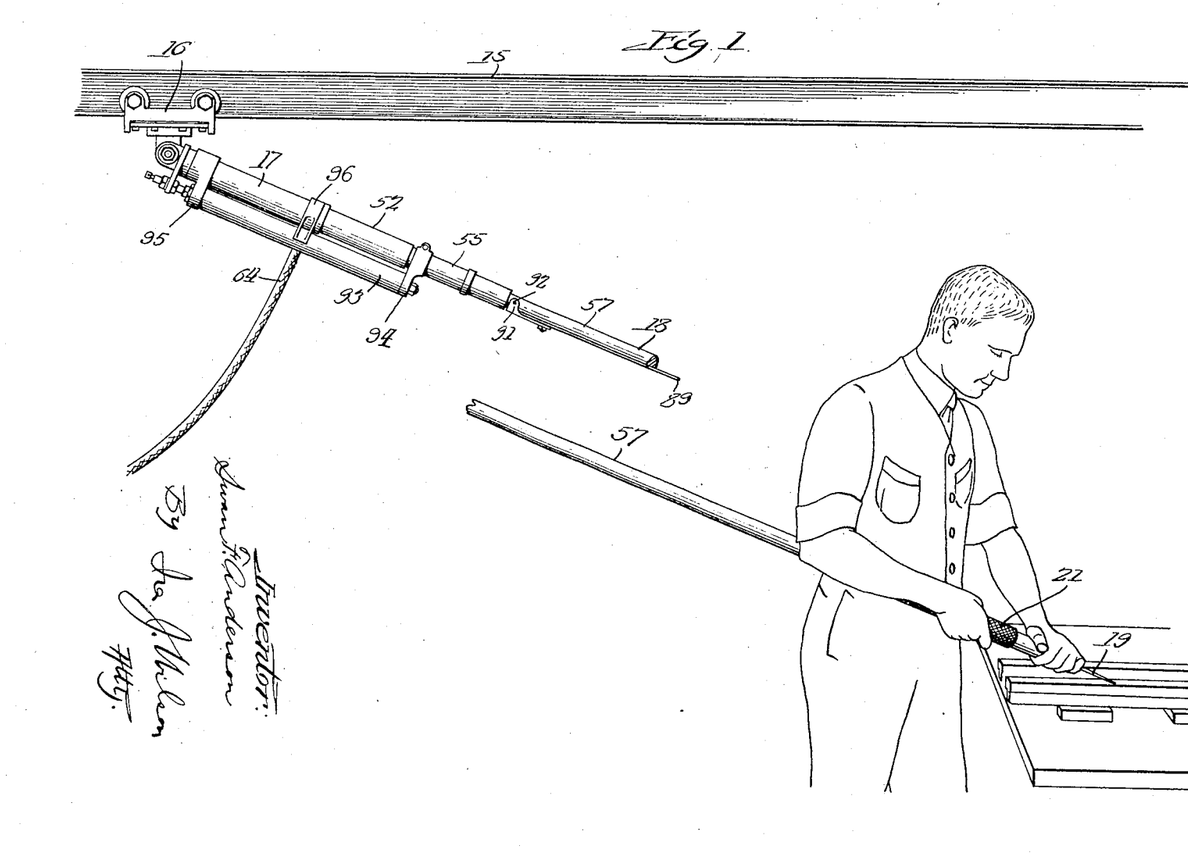
Figure 1 illustrates an operator in the act of using a surface-working machine embodying my improvements.
Figures 8, 9, 10, 11, 12, 13, 14:
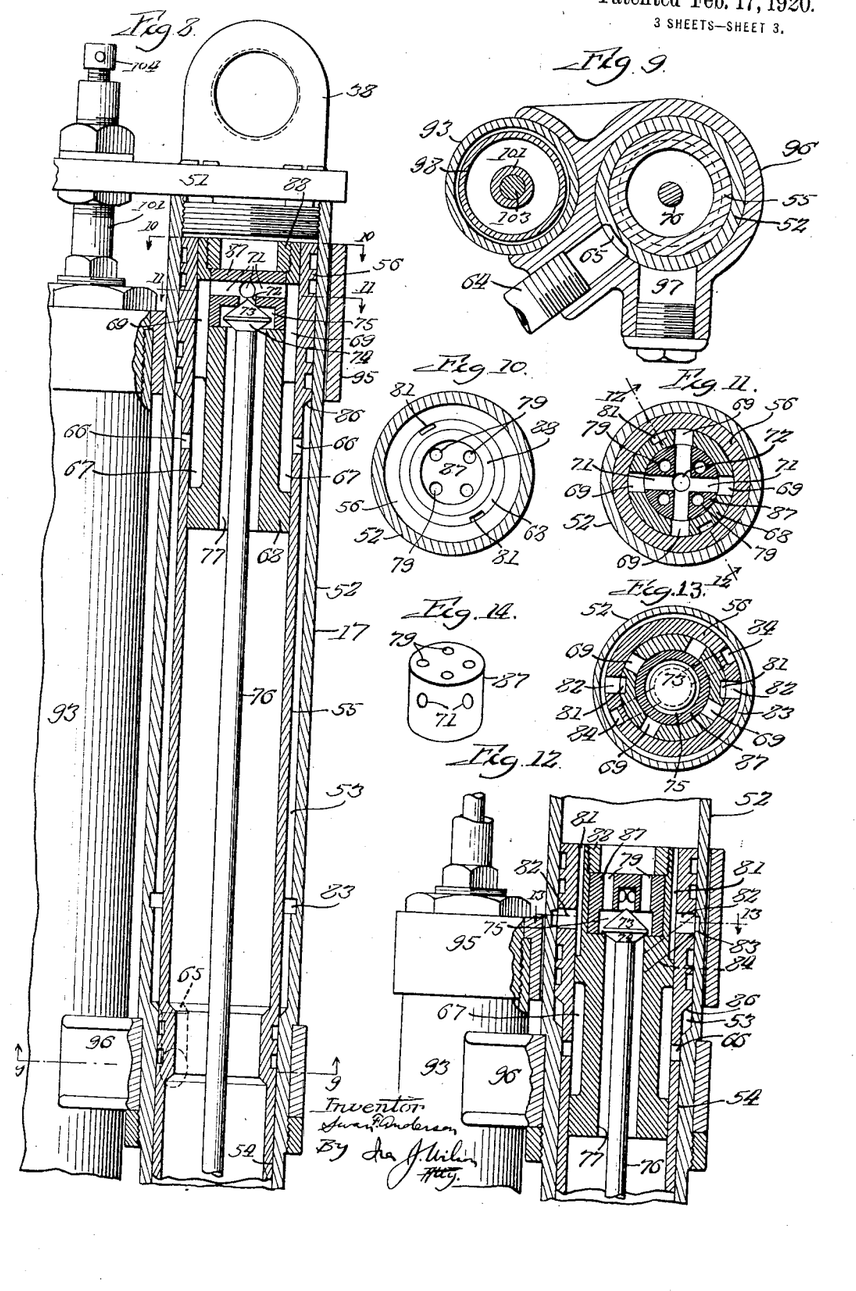
Fig. 8, an enlarged sectional view of the valve mechanism shown in Fig. 4.
Figs. 9, 10 and 11, cross-sectional views taken substantially on the lines 9—9, 10—10 and 11—11 of Fig. 8.
Fig. 12, a longitudinal sectional view taken substantially on the line 12—12 of Fig. 11, showing the piston at the end of its working stroke.
Fig. 13, a cross-sectional view taken substantially on the line 13—13 of Fig. 12.
Fig. 14, a detail perspective view of one of the valve chamber parts of the valve mechanism.

The means by which the fluid is controlled for reciprocating the piston will now be described. It is intended that this means shall be arranged in a very simple and effective manner peculiar to the particular work in hand, that is, for effecting the variable working stroke which is controlled as will be presently seen, by manipulation of the tool. It will be borne in mind that because of the nature of the work performed it is desired that the power-operated mechanism shall be instantly responsive to the throttle in order that the working strokes and the operation in general shall simulate the hand operation as much as possible. I have arranged the valve mechanism in the head of the piston and for purpose of simplicity and other advantages, this valve mechanism includes practically a single working part, namely, a valve which might be termed a throttle valve. Referring now more particularly to Figs. 8 to 13 inclusive, it will be noted that air under the desired pressure is entered through the pipe 64 and the passage 65 (Figs. 8 and 9) to the lower end of the cylinder compartment 53 and is continually present therein. With the piston in its retracted position as shown in Figs. 1, 4 and 8 this air passes from the cylinder compartment 53 through a series of ports 66 in the piston, into an annular compartment 67 formed in the piston head by securing therein what might be termed a valve casing designated generally by character 68. As shown in Figs. 4, 8 and 11, the valve casing has four longitudinal peripheral grooves 69, which communicate the compartment 67 with four transverse or radial passages 71 emanating from a central passage 72 normally closed by a cone valve 73. This valve, which is in effect a double valve having cone surfaces 73 and 74 located in a valve compartment 75, is fixed to the end of a valve rod 76 passing through a central bore 77 in the valve casing 68 and down through the piston 55 and also through the swivel part 59. An expansion spring 78, Fig. 4, constantly urges the valve in a direction to seat its cone surface 73 and close the passage 72. The valve is adapted to be moved in the opposite direction by manual operation through the agency of a throttle or control device which will be described later. It will be noted that with the tool in the normal inactive position shown in Fig. 8, the air pressure leads through the ports 66 and passages 67, 69 and 71 to the closed passage 72. Upon unseating the valve 73 by a very slight downward movement thereof the air will be admitted to the valve chamber 75 and permitted to pass up through a plurality of passages 79 to the head of the cylinder and thereupon will exert its pressure in forcing the piston down to perform the working stroke. So long as the valve 73 is held unseated a continuous full length stroke will be effected until the piston reaches the point shown in Fig. 12 in which the ports 66 are shut off by entering the smaller cylinder compartment 54, thus cutting off the air supply to the head end of the cylinder. This air in the head of the cylinder will now exhaust by passing down through the longitudinal peripheral passage 81 in the valve casing 68, through the radial passages 82 in the head of the piston, the annular passage 83 in the cylinder, the inclined passage 84 in the piston head and valve casing to the central bore 77 and thence to the outer atmosphere through the ports 85 (Fig. 4) in the lower portion of the piston. As mentioned above, the air pressure is constant in the cylinder compartment 53, and since the air supply has been cut off in the head of the piston and the exhaust has taken place, the air pressure will be exerted upon the undersurface 86 of the piston, viewing Fig. 12, and will return the same to the head of the cylinder. During this return movement the air has access through the ports 66 to the opening 72, but this is as far as the air may go as this port remains closed by the valve 73. It will be here noted, however, that the instant the valve 73 is unseated at any point in the return stroke, air will be admitted to the head of the cylinder and will drive the piston forwardly again to the end of the stroke,—provided the valve 73 is held unseated. On the other hand, if at any time during the working stroke the valve 73 is allowed to seat, the air pressure to the head of the cylinder will be cut off and the piston will be retracted by the influence of the air against the surface 86, the air under such circumstances exhausting down through the passages 79, 77 and the ports 85. Attention is directed to the construction of the valve casing as regards the ports 71, 72, 79 and the chamber 75. These are formed in a separate cylindrical block 87 shown in Fig. 14 and held in position by a lock nut 88 in the valve casing, as shown clearly in Fig. 8. From the foregoing it will be manifest that I have provided a power-operated means for reciprocating a tool holder whereby upon actuation of a throttle valve or control element the tool may be moved under pressure either in a full working stroke, or at any point in the return movement the tool may be again forced forwardly in a partial working stroke, or commencing from the normal idle or retracted position, a working stroke of any length within the limit of the tool may be obtained by proper actuation of the throttle. In other words, the piston is immediately responsive to its control device to produce a back-and-forth working stroke of any length within the limits of the machine; and thus it is possible to secure short quick strokes or long strokes, or any variation of these, the same as a workman might perform when using a hand tool.

As regards the manual control of the throttle valve just described my invention contemplates the provision of a manually operable device adjacent to the tool end of the tool holder adapted to be actuated at will by one of the hands employed to guide and manipulate the tool. While a control device or throttle for this purpose might be constructed and arranged in various ways, I prefer that it shall be embodied in such form as is most convenient and natural to operate, and in this respect the preferred form which I have illustrated is peculiarly advantageous in that the actuating movements of the throttle correspond with the reciprocating movements of the tool holder. That is, I prefer to employ a sleeve member 21 mentioned above, embracing and slidable lengthwise on the tool holder part 60 and to provide a suitable operating connection between this sleeve and the valve rod 76 comprising in the present instance, a rod 89 and a yoke 91 carrying a pin 92 connected to the lower end of the valve rod and passing through slots (indicated by dotted lines, Fig. 4) in the part 58. A slight movement of the sleeve 21 longitudinally on the tool holder 60 will correspondingly move the valve rod and the valve 73 for the purpose of effecting the working and return strokes under the influence of the fluid pressure as described above. In Fig. 1, I have illustrated the manner in which an operator holds the tool during use. In this particular illustration the workman is engaged in scraping a flat metal surface, and it will be noted that the left hand grasps the tool and the end of the holder so that the operator can with this hand hold the blade flat on the work and guide the tool during the working stroke, and may throw more or less weight on the tool to secure a light or heavy cut and may also oscillate the tool in the manner described above. The right hand grasps the throttle sleeve 21 and by a slight forward movement of this sleeve the valve 73 will be unseated, causing the tool to be pushed forward by air pressure. This forward movement will continue so long as the sleeve 21 is pushed forward and until the end of the stroke, whereupon the forward pressure on the sleeve is released permitting the tool to retract. It will be especially noted that this operation and the control thereof enables free use of the arms and a natural forward and back swinging movement, permitting the operator to skilfully guide the tool with as much downward pressure as is needed, relieving him of the labor formerly involved by using hand power to push the tool forward. Furthermore, the throttle is controlled by a simple forward and back movement of one hand corresponding with the movement of the tool desired to be effected, and that this hand which operates the throttle also coöperates in guiding the tool. It might be well to mention at this point that upon actuation of the throttle sleeve 21 to start the working stroke the air which is admitted to the head of the cylinder 52 is also simultaneously admitted to the chamber 28 for clamping the carriage 16 to the guide rail as described above. Thus, during the working stroke the carriage is rigid and provides a stable and immobile base which takes the back thrust of the tool, and at any other time the carriage is free to move so that the operator may move the tool about to adjust the range of operation and accommodate the tool to the particular conditions at hand.

Means is now provided for governing the speed of the working stroke so that this may be regulated to a nicety to give a properly moderated stroke according to the nature of the work. For this purpose a fluid governor is employed with a regulable valve adjustable to increase or diminish the speed of the working strokes, and the invention contemplates also the provision for a quick return of the tool if desired. Referring now more particularly to Fig. 4, I have arranged an oil reservoir 93 alongside of the cylinder 52 and have fixedly secured this reservoir to the lower end of the piston 55 by means of a cross head 94. This reservoir therefore, travels with the piston, and a guide 95 fixed to the upper end of the reservoir embraces the cylinder and holds the reservoir in alinement therewith. An intermediate guide 96 fixed to the cylinder partially embraces the reservoir 93 and provides for the attachment of the air supply hose 64 as shown in Fig. 9. This guide bracket is also equipped with a grease compartment 97 for holding a lubricant for the piston. Within the oil reservoir and fixedly secured to the cross-head 94 is a governor cylinder 98 in which operates a piston 99, the piston rod 101 of which is tubular and extends through a packed joint 102 at the upper end of the reservoir and is adjustably connected with the head 51 of the main cylinder. Within the piston rod is disposed a valve stem 103 adjustable longitudinally upon and with respect to the piston rod by turning its end 104 for the purpose of increasing or diminishing the effective area of the ports 105 in the piston rod. In the retracted position of the tool-operating piston the governor piston 99 is at the lower end of the cylinder 98. This cylinder is filled with oil and the reservoir 93 also is practically filled with oil, there being an oil space around the cylinder 98. The interior of the cylinder 98 communicates through the port 105, the central bore 106 in the valve rod and the ports 107 with the main reservoir, so that regardless of the working position of the tool the cylinder 98 will be filled with oil. As the tool holder is advanced in its working stroke the reservoir 93 and cylinder 98 will move with the piston 55 and the tool holder and the piston 99 which is stationary will in effect, be advanced in the cylinder 98. The speed of the stroke, assuming a given air pressure, will be modulated and governed by the flow of oil through the ports 105, and likewise the return stroke of the tool carrier will be governed in the same manner. By adjusting the valve 104 to enlarge or restrict the effective area of the ports 105, it will be manifest that the oil will be permitted to flow more or less freely therethrough, thus increasing or diminishing the speed of the tool as the case may be.

I have also aimed to provide for a comparatively quick return of the tool, and for this purpose I have shown in Fig. 7 a modified form of governor, different from that first described by reason of the employment in addition thereto of a one-way valve permitting a free passage of the liquid or oil through the piston 99 on the return stroke of the tool. To this end, a plurality of ports 108 passing through the piston 99 are normally closed by a spring-pressed valve 109. This provides a one-way valve which permits the oil to flow freely through the ports 108 when the tool holder is retracted, and thus enables a quick return movement. The operation of this construction will be evident as it will be seen that the regulable ports 105 govern the speed of the working stroke the same as in the former case and that upon the return stroke the valve 109 unseats and the oil flows freely through the ports 108 allowing relative movement between the piston 99 and the cylinder 98 against but little resistance, which of course is regulable by the strength of the spring acting on the valve 109 and by the size of the ports 108.

It is believed that the foregoing conveys a clear understanding of the objects prefaced above and of the principles of my invention, it being particularly noted that while in illustrating them I have taken as an example the use of a fluid operated mechanism, my invention embraces the use of any suitable power medium for performing the functions necessary in attaining the objects in mind. Consequently, it will be recognized that these improvements are not limited to the particular working embodiment herein given, but are susceptible of considerable modification and the substitution of various forms of power where power is used. And it should be understood, that in carrying my improvements into effect various changes might be made in construction and arrangement and various power-operated mechanisms employed without departing from the spirit and scope of the invention as expressed in the appended claims.

I claim:

1. A surface-working machine comprising a manually guidable holder for a surface-working tool, power-operated means for imparting back-and-forth movement to the holder, and a throttle on the holder adapted to be actuated to control the power-operated means while guiding the holder.

2. A surface-working machine comprising a support movable with respect to the work, a surface-working tool connected with the support and freely manually guidable relatively thereto at all times for applying the tool at any position over a working area, power-operated mechanism for imparting back-and-forth movements to the tool, a throttle for controlling the power-operated mechanism, and means for securing the support in an immobile position.

3. A machine of the character described comprising a suitable support, a carriage movable on the support, a reciprocable tool attached to the carriage, power-operated means for reciprocating the tool, and means for automatically locking the carriage upon the support when the tool is moved under power on the working stroke and for releasing the carriage on the return stroke.

4. A machine of the character described comprising a guide, a carriage movable along the guide, a power-operated and manually guidable tool attached to the carriage, and means for automatically locking the carriage on the guide when power is applied to put the tool into operation.

5. A machine of the character described comprising a mobile carriage, a power-operated tool connected with the carriage, a manually operable throttle for controlling the application of power to the tool, and means operated by actuation of the throttle for securing the carriage in a stationary position.

6. A machine of the character described comprising a mobile carriage carrying a power-operated tool and movable to adjust the range of operation of the tool, a manually operable control for putting the tool into operation, and means put into operation by the actuation of said control for securing the carriage in a permanent position and holding it there until released by further actuation of the control.

7. A machine of the character described comprising a track-way, a wheeled carriage movable on the track-way, a power-operated tool mounted on the carriage, a control device in connection with the tool for putting the tool into and out of operation, a locking element operable between the carriage and track-way, and means operated by actuation of the control device for causing said locking element to secure the carriage against movement on the track-way.

8. A machine of the character described comprising a track-way, a wheeled carriage movable on the track-way, a power-operated tool mounted on the carriage, a manually operable control device for controlling the application of power to the tool, a locking element operable between the carriage and track-way, and means for causing the locking element to secure the carriage in a permanent position on the track-way when the control device is actuated.

9. A machine of the character described comprising a mobile support, a power-operated tool attached to the support, a throttle for controlling the application of power, and means caused to be operated by actuation of the throttle for securing the support in a permanent working position.

10. The combination of a guideway, a carriage movable on the guideway, a fluid-operated locking element operable between the carriage and guideway for securing the carriage in a fixed position thereon, a cylinder pivotally mounted on the carriage, a piston in the cylinder equipped with a tool holder, and means for admitting fluid under pressure to the cylinder and to the locking element for actuating the same substantially simultaneously.

11. In a machine of the character described, the combination of a mobile carriage, a tool-carrying device mounted on the carriage and having a tool holder reciprocable with respect to the carriage, power-operated means for reciprocating the tool holder, means for securing the carriage in a stationary position, and means operated from a common control for causing the tool to be operated by power and the carriage to be locked in a working position.

12. In a surface-working machine, the combination of a guideway, a carriage movable upon the guideway, a cylinder supported by the carriage, a piston in the cylinder, a tool holder operated by the piston, fluid-operated means for locking the carriage in connection with the guideway, and means operated from a common control for admitting fluid to the cylinder and said carriage-locking means.

13. In a machine of the character described, the combination of a guideway, a carriage movable thereon, a fluid-operable means for locking the carriage in position on the guideway, a reciprocable tool-holder pivotally mounted on the carriage and operated by fluid pressure, means for admitting fluid under pressure to operate the tool-holder, and means permitting said fluid to pass through the pivotal connection between the tool carrier and carriage for operating the locking means.

14. A machine of the character described comprising an overhead support, a carriage movable on the support, a depending elongated tool-holder pivotally connected at its upper end to the carriage and adapted for carrying at its lower end a tool, power-operated means mounted on the tool holder for operating the tool, and a control device mounted on the tool holder adjacent to the tool-equipped end thereof for controlling the power-operated means.

15. A surface-working machine comprising a suitable supporting frame, a tool-carrier pivotally mounted on the frame and having a reciprocable tool-carrying element, power-operated means for reciprocating the tool-carrying element, and manually operable means on the tool-carrying element for controlling the application of power.

16. A surface-working machine comprising a reciprocable tool holder adapted for carrying a surface-working tool, power-operated means for moving the tool holder to perform the working stroke, and a manually operable device mounted directly on and moving with the tool holder and having connection with the power-operated means and adapted to be manipulated for controlling the application of power by one of the hands which guides the tool in its working stroke.

17. A surface-working machine comprising a supporting frame, a tool-carrier mounted on the frame and having a reciprocable tool-holding part, power-operated means for moving the tool-holding part in a working stroke, a manually operable part on the tool carrier for controlling the power-operated means, said manually operable part being so associated with the power-operated means as to cause said means to produce the working stroke when the manually operable part is moved in the direction of said stroke.

18. A surface-working machine comprising a tool-carrying part, power-operated means for reciprocating said part to move a tool carried thereby back and forth over a surface being worked, a manually operable control or throttle for controlling the power-operated means and arranged on the tool-carrying part so as to be operable by one of the hands which manipulates the tool, said control part being movable relatively to the tool-carrying part in the direction of the working stroke to put the power-operated means into operation for effecting the working stroke and being actuable at any point in the working stroke to instantly stop the same.

19. A surface-working machine comprising a suitable supporting means, a cylinder pivotally mounted thereon, and a piston in the cylinder terminating in a tool carrier which is free to oscillate about the longitudinal axis of the piston.

20. A surface-working machine comprising a suitable supporting means, a cylinder mounted thereon, a piston in the cylinder terminating in a tool carrier which is free to oscillate about the longitudinal axis of the piston, valve means for admitting a fluid under pressure to the cylinder, and a manually operable control adjacent to the tool carrying end of the piston for controlling the valve means.

21. A surface-working machine comprising a suitable supporting means carrying a cylinder, a combined piston and tool-carrier adapted to be reciprocated by the action of a fluid on the piston, valve means for controlling the fluid, the tool-carrier being freely manipulable to direct and guide the tool in its working stroke, and control means on the tool carrier for operating said valve means, whereby the latter is under direct control of one of the hands which guides the tool.

22. A surface-working machine comprising a suitable frame which is stationary in its working position, a tool-carrying device pivotally mounted at one end on the frame and including a reciprocable element at its opposite end adapted for carrying a surface-working tool, power-operated means for reciprocating the tool-carrying element which is free to be manipulated and guided under the will of an operator, and means under control of the operator for governing said power-operated means.

23. A surface-working machine comprising a suitable supporting frame, a cylinder carried thereby, a piston in the cylinder, a tool holder operated by the piston, a second cylinder and a piston therein, a valve-controlled port between the second piston and cylinder, the second cylinder and piston constituting a governor for regulating the speed of the tool operating piston, and means for causing relative movement between the second cylinder and piston when the tool-operating piston is operated.

24. In a surface-working machine, the combination of a cylinder, a suitable support therefor, a piston operable in the cylinder, a tool holder directly connected to and reciprocable with the piston, valve-controlled means for causing fluid under pressure to reciprocate the piston, and a valve control device on the tool holder for operating said valve means.

25. In a surface-working machine, the combination of a main cylinder, a piston therein, a tool holder connected with and operated by the piston, means controlling reciprocation of the piston through the medium of a fluid under pressure, and a governor for governing the speed of the piston comprising a cylinder and a piston, one of which is connected with the main cylinder and the other with the piston therein, and a regulable valve controlling the flow of fluid past the governor piston.

26. A surface-working machine comprising a cylinder, a piston therein, a tool holder connected with and operated by the piston, an oil reservoir connected to and moving with the piston, a cylinder within the reservoir moving therewith, a piston within the latter cylinder and connected with the main cylinder, means for causing the piston in the main cylinder to be reciprocated through the medium of a fluid under pressure, and regulable means for governing the passage of fluid past the piston in the governor cylinder.

27. A surface-working machine comprising a cylinder having two compartments of different diameters, a piston slidably fitting in the compartment of the smaller diameter and having a head slidably fitting in the compartment of the larger diameter, a tool holder connected with and reciprocated by the piston, a valve in connection with the piston for admitting fluid under pressure to the cylinder to move the piston in one direction, and means permitting the fluid under pressure to operate on the opposite end of the piston head within the larger cylinder compartment for moving the piston in the opposite direction.

28. The combination of a mobile support, a power-operated tool carrier mounted on the support, means for locking the support in an immobile working position, and means for causing the locking means to be automatically operated to intermittently render the support mobile and immobile.

29. The combination of a mobile support, a power-operated tool carrier mounted on the support, means for locking the support in an immobile working position, and means for causing the locking means to be automatically operated to render the support immobile during a working period of the tool and mobile during an idle or non-working period.

30. A surface-working machine comprising a suitable support, a tool holder capable of free manual guidance to direct and apply the tool at the will of an operator, power-operated means for imparting back-and-forth movement to the tool holder, and a governor for modulating the speed of the working stroke of the tool holder and for permitting a quick return of the tool holder at the finish of the working stroke.

31. A surface working machine of the character described comprising a suitable base fixed with respect to the work, a surface-working tool freely manually guidable for application to the work at any point within the working area, power-operated means operative between said base and tool for reciprocating the latter without interference with free manual guidance of the tool, and a control device moving with the tool for controlling said power-operated means.

32. A machine of the character described comprising a mobile carriage, a power-operated reciprocable tool connected with the carriage and operable over a variable area according to the range of movement of said carriage, a control device for controlling the application of power to the tool, and means for rendering the carriage immobile, whereupon it constitutes a rigid base which takes the back thrust of the tool.

33. A machine of the character described comprising a mobile carriage, a power-operated and manually guidable tool attached to the carriage and having a variable range of operation according to the range of the carriage, means for rendering the carriage immobile, and manually actuable control mechanism for putting said tool into operation and for causing the carriage to be automatically secured in an immobile position.

34. A machine of the character described comprising a suitable support, a base movable upon the support, a power-operated and manually guidable tool attached to the carriage, and a locking element operable between the base and said support and actuated by the same source of power as employed for operating the tool, to secure the base in a working position on the support.

35. The combination of a carriage movable in a horizontal plane, a tool-carrying device pivotally mounted on the carriage to turn about a horizontal axis and a vertical axis, a reciprocable tool holder carried by said device and adapted to be manually guided, power-operated means for reciprocating said tool holder, and means on the holder for controlling said power-operated means.

36. In a machine of the character described the combination of a guideway, a carriage movable thereon, fluid-operated means for securing the carriage in position on the guideway, a tool holder pivotally mounted on the carriage and operable by fluid pressure, and means permitting fluid to pass through the pivotal connection between the carriage and tool holder for operating said means for securing the carriage in position on the guideway.

37. A machine of the character described comprising an overhead horizontally disposed guideway, a carriage movable horizontally on said guideway, an elongated tool holding device pivotally connected at its upper end to the carriage and having a reciprocable tool holder at its lower end, and power-operated means for reciprocating said tool holder, the latter of which is manually guidable at its free end during said power operation.

38. A surface-working machine comprising a suitable base, a reciprocable tool holder mounted on the base, power-operated means for reciprocating the tool holder, the latter of which is freely manually guidable at its free end during said power operation, and manually operable means on the tool holder for controlling the application of power.

39. A surface-working machine of the character described comprising a reciprocable tool holder adapted for carrying a surface working tool, power-operated means for reciprocating the tool holder, means for so supporting said tool holder that it is capable of free manual guidance and application to the work during said power operation, and a manually operable device upon and moving with the tool holder and connected with the power-operated means for controlling the application of power.

40. In a machine of the character described, the combination of a base, a cylinder pivotally mounted therein, a piston in the cylinder valve mechanism adapted to be actuated for causing the piston to be reciprocated, a pole of substantial length secured at one end to the piston in substantially axial alinement therewith and equipped at its opposite end with a tool holder, said tool holder end of the pole being manually operable to guide the tool, and a control device on said tool holder end of the pole connected with said valve mechanism for controlling operation of the piston.

41. In a machine of the character described, the combination of a base, a cylinder pivotally mounted thereon, a piston in the cylinder, valve mechanism adapted to be actuated for causing the piston to be reciprocated, a pole of substantial length connected co-axially with the piston and free to oscillate relatively thereto about the longitudinal axis thereof, a tool holder mounted on the free end of the pole, and control means associated with the pole and connected with said valve mechanism for controlling reciprocation of the piston.

42. A machine of the character described comprising a pole of substantial length equipped at one end with a tool holder, power-operated means attached to the opposite end of the pole for reciprocating the same lengthwise, and a sleeve on the tool holder end of the pole and connected with said power-operated means and movable relatively to the pole for controlling the operation of said power-operated means.

43. A machine of the character described comprising an overhead guideway, a wheeled carriage slidable upon said guideway, a cylinder pivotally attached to the carriage, a piston in the cylinder, a pole secured to the piston, a tool holder secured to the outer end of the pole, means for securing the carriage at any of a plurality of positions on the guideway, valve mechanism for causing the piston to be reciprocated by fluid pressure, and manually operable means for controlling the valve mechanism.

44. A surface working machine of the character described comprising a mobile base, an elongated tool carrying device attached at on end to the base and equipped at its opposite end with a tool holder which is free to be manually shifted and guided with respect to the base, power-operated means for reciprocating said tool holder, means for securing said base in an immobile position at will, and manually operable means associated with the tool holder end of said tool-holding device for controlling said power-operated means.

45. In a machine of the character described, the combination of a cylinder, a piston therein, and a rod attached to the piston co-axial therewith, a tool holder on the free end of said rod, valve mechanism in the head of the piston, and valve-actuating means operable from the tool holder end of said pole for controlling reciprocation of the piston.

46. A surface working machine comprising a suitable support disposed in fixed relation to the work, a cylinder carried by the support, a piston in the cylinder, a pole of substantial length attached at one end to the piston and equipped at its opposite end with a tool-receiving socket, a scraping tool rigidly secured in said socket, and means operated from the tool socket end of the pole for controlling operation of the piston by fluid pressure.

47. A surface working machine of the character described comprising a pole equipped at one end with a tool-receiving socket, a scraping tool rigidly secured in said socket, power operated means for reciprocating the pole, the pole being so mounted that its tool socket end is manually guidable during the power stroke to direct and manipulate the tool at will, and means associated with the pole for controlling said power-operated means.

48. A machine of the character described comprising a base, a reciprocable tool holder, power-operated means mounted on said base for reciprocating the tool holder, said tool holder being so mounted and constructed that its tool-carrying end is adapted to be freely moved vertically and horizontally with respect to the base, whereby the tool may be manually applied over a considerable area, and a control device upon and moving with the tool holder for controlling said power-operated means.

SWAN F. ANDERSON.